(12) United States Patent
Kimura et al.

(10) Patent No.: US 6,222,678 B1
(45) Date of Patent: Apr. 24, 2001

(54) AUTOMATIC SURVEY INSTRUMENT

(75) Inventors: Akio Kimura; Ikuo Ishinabe, both of Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 09/391,580

(22) Filed: Sep. 8, 1999

(30) Foreign Application Priority Data

Sep. 19, 1998 (JP) .................................................. 10-263841

(51) Int. Cl.[7] .......................... G20B 27/14; G00B 27/12; G01C 3/08; G01C 21/02; G01N 21/86
(52) U.S. Cl. .................... 359/634; 356/5.01; 356/5.04; 250/203.2; 250/559.58; 359/640
(58) Field of Search ...................... 359/350, 634, 359/636, 638, 639, 640, 834; 356/3.03, 3.11, 4.01, 5.01, 5.04; 250/203.1, 203.2, 559.38

(56) References Cited

U.S. PATENT DOCUMENTS

| | | | |
|---|---|---|---|
| 4,611,911 | * 9/1986 | Kadomatsu | 356/5 |
| 5,440,112 | 8/1995 | Sakimura et al. | 250/203.1 |
| 5,923,468 | * 7/1999 | Tsuda et al. | 359/426 |
| 5,936,736 | * 8/1999 | Suzuki et al. | 356/375 |
| 6,137,569 | * 10/2000 | Sasaki et al. | 356/153 |

* cited by examiner

*Primary Examiner*—Georgia Epps
*Assistant Examiner*—David N. Spector
(74) *Attorney, Agent, or Firm*—Nields & Lemack

(57) ABSTRACT

The present invention provides an automatic survey instrument, which comprises an objective lens, a focusing lens, and optical means positioned between the objective lens and the focusing lens, all of the components being arranged on an optical axis, wherein the optical means comprises a first reflection surface at least for transmitting visible light and a second reflection surface at least for transmitting light at a predetermined wavelength, and reflection light from the first reflection surface reaches the second reflection surface and reflection light from the second reflection surface runs perpendicularly to the optical axis.

3 Claims, 2 Drawing Sheets

AUTOMATIC SURVEY INSTRUMENT

BACKGROUND OF THE INVENTION

The present invention relates to an automatic survey instrument, and in particular, to an automatic survey instrument provided with a telescopic optical system, which can divide reflection light to tracking light, range-finding light and visible light.

FIG. 2 shows an essential portion of an automatic survey instrument. Similarly to a general type survey instrument, the automatic survey instrument comprises a leveling unit 1 mounted on a tripod, a base unit 2 mounted on the leveling unit 1, a frame unit 3 mounted rotatably around the vertical axis on the base unit 2, and a telescope unit 4 mounted rotatably around the horizontal axis on the frame unit 3. Further, in the automatic survey instrument, the frame unit 3 and the telescope unit 4 are rotated and driven by a built-in motor (not shown), and these components can be operated remotely or automatically.

The telescope unit 4 comprises an optical system, which projects measuring light and receives reflection light from a target object. Collimation is performed on the target object based on the received reflection light, and there are provided tracking means for detecting and tracking the target object and range-finding means for measuring distance to the target object.

The measuring light projected from the telescope unit 4 is reflected by a mirror installed on the target object. By receiving the reflected light, the surveyor performs collimation of the target object using the survey instrument or measures the distance or performs automatic tracking of the target object.

In the survey instrument for automatically tracking the target object as described above, the projected measuring light contains the light components of different wavelengths for tracking or for range-finding. The reflection light reflected by the target object and received is divided, depending on the purpose, to light components with different wavelengths such as the light for tracking, range-finding and the visible light. Using the range-finding light and the tracking light thus divided, range-finding and automatic tracking can be performed. The division or separation of light components with different wavelengths is accomplished by optical means, which is arranged on an optical path of the optical system of the telescope unit 4. As the optical means for dividing the light components to a plurality of wavelengths, a dichroic prism is widely used.

Now, referring to FIG. 3, description will be given on an optical system of a conventional type automatic survey instrument having optical means for dividing the light components to the components with three different wavelengths.

This optical system comprises an objective lens 5, a focusing lens 6, an erect prism 7, a focusing mirror 8, and an ocular lens 9. A dichroic prism 10 serving as the optical means is arranged between the objective lens 5 and the focusing lens 6. Further, a reflection mirror 11 for projecting the tracking light is arranged between the objective lens 5 and the dichroic prism 10.

The focusing lens 6 is arranged in such manner that it can be moved along the optical axis O. The laser beam entering through the objective lens 5 is converged to form an image on the focusing mirror 8. The image formed on the focusing mirror 8 is turned to an erect image by the erect prism 7. The focusing mirror 8 has a scale to catch the target object at the center of collimation, and the ocular lens 9 forms an image of the target object formed on the focusing mirror 8 on a retina of the surveyor together with the scale. On the reflection light optical axis of the reflection mirror 11, a tracking optical system (not shown) is disposed, and the laser beam of the tracking light is projected toward the target object via the reflection mirror The dichroic prism 10 comprises a first dichroic mirror surface 15 and a second dichroic mirror surface 16 to traverse the optical path. A tracking light receiving unit (not shown) is arranged at a position opposite to the first dichroic mirror surface 15, and a receiving/emitting light dividing mirror 17 of the range-finding optical system is arranged at a position opposite to the second dichroic mirror surface 16. The range-finding optical system projects laser beam for range-finding toward the target object via the receiving/emitting light dividing mirror 17, and receives the reflection laser beam for range-finding via the receiving/emitting light dividing mirror 17.

As described above, the projected measuring light contains light components with different wavelengths for tracking and range-finding. The following light components with different wavelengths are used: visible light with wavelength of 400 nm to 650 nm is used for collimation, infrared light with wavelength of 650 nm is used for tracking, and infrared light with wavelength of 800 nm is used for range-finding.

When the reflection light enters through the objective lens 5, tracking reflection light is reflected by the first dichroic mirror surface 15, and the tracking light is separated from the light component for range-finding and from the visible light. The tracking light receiving unit receives the tracking reflection light. Based on the result of light receiving, a control unit (not shown) of a main unit of the automatic survey instrument drives the motor and automatically adjusts a posture of the instrument so that the target object comes to the center of collimation of the survey instrument.

After the laser beam passes through the first dichroic mirror surface 15, the range-finding light is further reflected by the second dichroic mirror surface 16, and the range-finding light and the visible light are separated from each other. The separated range-finding light is received by the range-finding optical system, and the distance is measured. After passing through the second dichroic mirror surface 16, the visible light is observed by the surveyor via the ocular lens 9, and collimation at the installation of the automatic survey instrument and collimation at the measurement are performed.

The conventional type automatic survey instrument as described above is designed in such manner that the dichroic prism 10 for dividing light components to visible light, tracking light and range-finding light sequentially divides the incident reflection light components with different wavelengths on optical axis of the telescope unit 4 to tracking reflection light, range-finding reflection light and visible light. The dichroic prism 10 must have the first dichroic mirror surface 15 and the second dichroic mirror surface 16, which have such size as necessary for receiving the luminous flux which has passed through the objective lens and must be of such length as to reflect the tracking reflection light and the range-finding reflection light respectively. For this reason, the dichroic prism 10 must be necessarily of considerable size. A large dichroic prism 10 is expensive, and it also requires the telescope unit 4 of larger size. When the telescope unit 4 is designed in larger size, a part of the electrical circuits of electrical system and range-finding system must be disposed on the frame unit, and this leads to the problem that the survey instrument itself becomes larger and heavier. The increase of weight results in the increase of power consumption for driving, and additional power supply must be provided.

Further, the first dichroic mirror surface 15 of the dichroic prism 10 separates only a part of infrared light among the infrared light and visible light, and an optical membrane generated on the first dichroic mirror surface 15 must have complicated structure and requires higher cost.

SUMMARY OF THE INVENTION

To solve the above problems, it is an object of the present invention to achieve optical means in small size for dividing incident light to light components with different wavelengths, to simplify the optical membrane generated on the reflection surface of the optical means, and to reduce cost for the optical means and to design the automatic survey instrument in compact size.

The automatic survey instrument according to the present invention comprises an objective lens, a focusing lens, and an optical means positioned between the objective lens and the focusing lens, all of the components being arranged on optical axis, wherein the optical means comprises a first reflection surface at least for transmitting visible light and a second reflection surface at least for transmitting light with a predetermined wavelength, and reflection light from the first reflection surface reaches the second reflection surface and reflection light from the second reflection surface runs perpendicularly to the optical axis. Further, in the automatic survey instrument according to the present invention, the first reflection surface is a dichroic mirror and transmits at least visible light, and the second reflection surface is a dichroic mirror and transmits at least light with one infrared wavelength. Further, in the automatic survey instrument of the present invention, the first reflection surface of the dichroic mirror transmits light with wavelength of 400 nm to 650 nm and reflects light with wavelength of 650 nm to 850 nm, and the second reflection surface reflects light with wavelength of 650 nm to 720 nm and transmits light with wavelength of 720 nm to 850 nm, and among a plurality of reflection surfaces for dividing incident light having a plurality of wavelengths to light components with a plurality of wavelengths, only one reflection surface is positioned on the optical axis, and this reduces the length in the direction of optical axis and contributes to compact design of the optical means and controls attenuation rate of visible light to low level because visible light passes through only one reflection surface.

DETAILED DESCRIPTION OF THE PREFERRED EMBODIMENT

In the following, description will be given on an embodiment of the present invention referring to the attached drawings.

Figure 1:
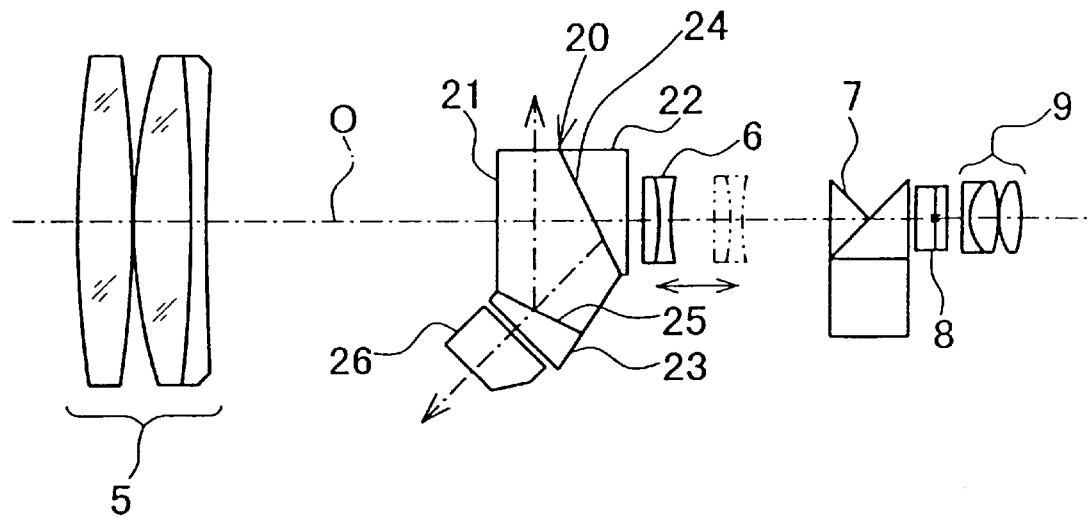
FIG. 1 is a drawing to show an arrangement of essential components of an embodiment of the present invention.
Figure 2:
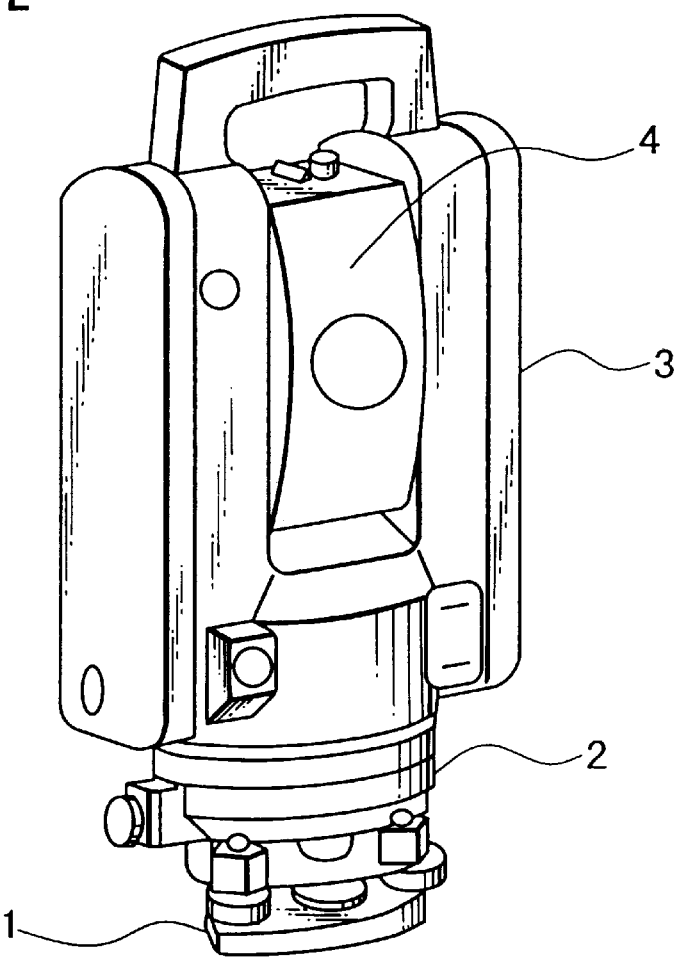
FIG. 2 is a perspective view of an essential portion of an automatic survey instrument for executing the present invention.
Figure 3:
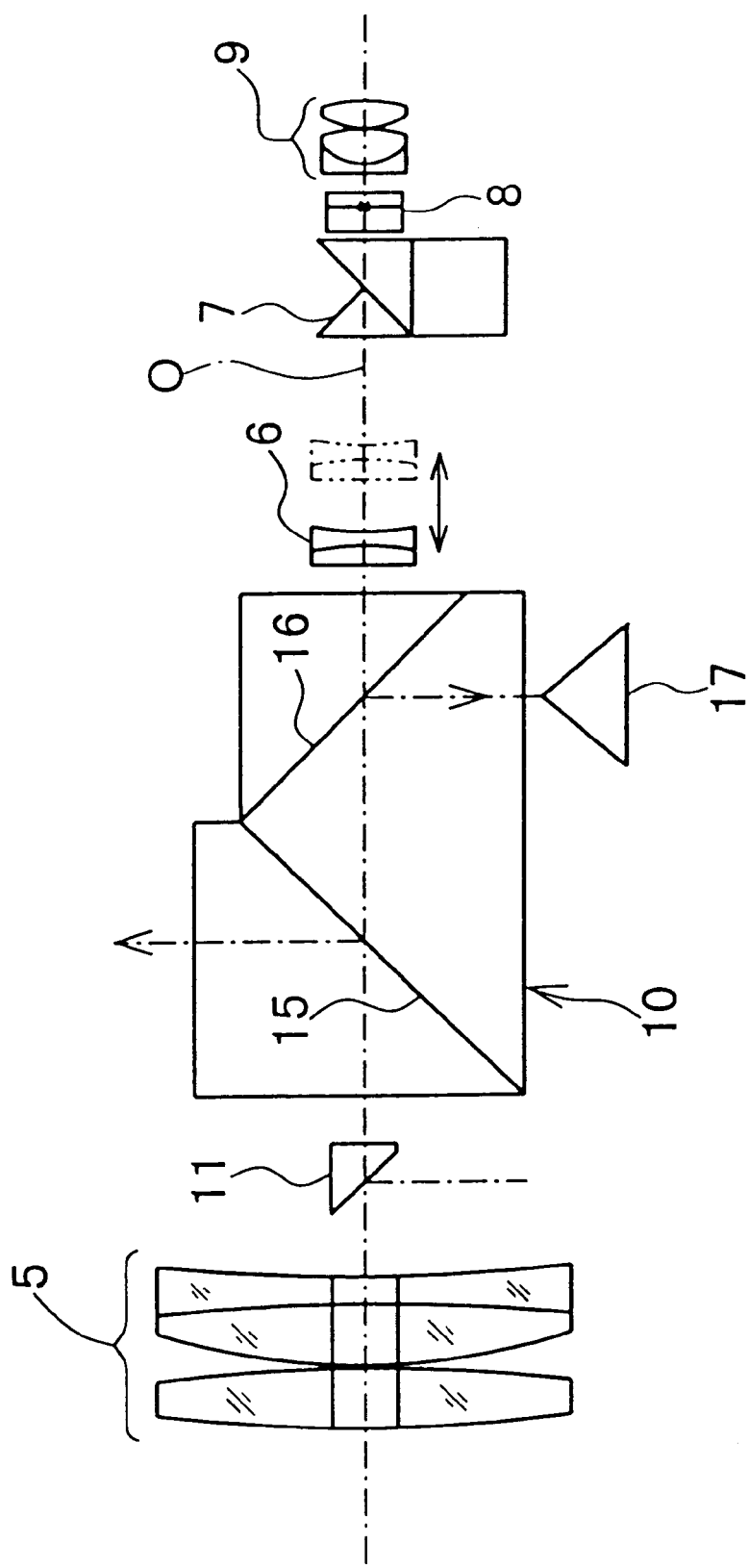
FIG. 3 is a drawing to show an arrangement of essential components of a conventional example.

In FIG. 1, the same component as in FIG. 3 is referred by the same symbol, and detailed description is not given here.

On an optical axis O, an objective lens 5, a focusing lens 6, an erect prism 7, a focusing mirror 8, and an ocular lens 9 are arranged in this order, and optical means, or more preferably a dichroic prism 20, is arranged between the objective lens and the focusing lens 6.

The dichroic prism 20 comprises wedge type prisms 22 and 23 attached on opposing surfaces of a pentagonal prism 21 so that a first dichroic mirror surface 24 and a second dichroic mirror surface 25 are formed.

Among incident reflection light components, the first dichroic mirror surface 24 transmits visible light and reflects infrared light. The second dichroic mirror surface 25 transmits range-finding light and reflects tracking light. On the optical axis of the reflection light of the first dichroic mirror surface 24, a range-finding optical system (not shown) is provided, and a tracking light receiving unit (not shown) is provided on the optical axis of the reflection light of the second dichroic mirror surface 25. A tracking light emitter (not shown) is arranged on the tracking light receiving unit side. In the figure, reference numeral 26 represents a receiving/emitting light dividing mirror, and it is arranged in transverse direction so that it can divide luminous flux to a direction perpendicular to paper surface.

The first dichroic mirror surface transmits visible light with wavelength of 400 nm to 650 nm, for example, and reflects the light with wavelength of 650 nm to 850 nm. The second dichroic mirror surface reflects light with wavelength of 650 nm to 720 nm and transmits light with wavelength of 720 nm to 850 nm.

In the following, description will be given on an operation.

When the reflection measuring light reflected by a target object enters through the objective lens 5, infrared light components, i.e., tracking reflection light and range-finding reflection light, are reflected by the first dichroic mirror surface 24, and visible light passes through the mirror surface. The visible light thus passing through forms an image on the focusing mirror 8 by means of the focusing lens 6. Then, the image is formed again on an retina of a surveyor together with the scale of the focusing mirror 8, and collimation is performed.

On the second dichroic mirror surface 25, between the infrared light components reflected by the first dichroic mirror surface 24, the tracking light is reflected and the range-finding light is transmitted. The tracking reflection light is projected through the pentagonal prism 21 in a direction perpendicular to the optical axis O and it is received at the tracking light receiving unit. Based on the results of light receiving at the tracking light receiving unit, a posture of the automatic survey instrument is automatically adjusted so that the target object comes to the center of collimation of the survey instrument as already described. After passing through the second dichroic mirror surface 25, the range-finding reflection light is received by a range-finding optical system (not shown), and the distance is measured. The optical axis O and the reflection light optical axis of the second dichroic mirror surface 25 may be or may not be on the same plane.

Because both the first dichroic mirror surface 24 and the second dichroic mirror surface 25 are designed in such manner that the light is divided to two components at a predetermined wavelength, an optical membrane formed is simple and available at low cost. Further, the dichroic mirror surface transmits light by selecting wavelength and reflects light components with the wavelength other than the selected wavelength, but it does not transmit the light completely. Therefore, in case light passes through the dichroic mirror surface by two or more times, light quantity of transmitting light beam is reduced because of high attenuation effect. In the present invention, visible light passes through the first dichroic mirror surface 24 only once. This means that light with sufficient light quantity passes through, and precise collimation can be accomplished.

The dichroic mirror surface arranged on the optical axis may be only the first dichroic mirror surface 24, and the second dichroic mirror surface 25 is arranged at a position deviated from the optical axis O. This means that the dimension of the dichroic prism 20 in the direction of the optical axis becomes shorter. Accordingly, by disposing the dichroic prism 20 at a position closer to the focusing lens 6, it is possible to increase the distance between the dichroic prism 20 and the objective lens 5. This makes it possible to reduce diameter of luminous flux of the laser beam entering the dichroic prism 20 and to design the dichroic prism 20 in more compact size.

Because the dichroic prism can be designed in compact size, manufacturing cost can be reduced, and a space large enough to accommodate electrical circuits for tracking system and range-finding system can be kept in the telescope unit side, and this contributes to compact and lightweight design of the entire automatic survey instrument. Further, attenuation of visible light can be controlled to low level, and this is helpful to the precise performance for collimation and to improvement of working efficiency.

What is claimed is:

1. An automatic survey instrument, comprising an objective lens, a focusing lens, and optical means positioned between said objective lens and said focusing lens, all of said components being arranged on an optical axis, wherein said optical means comprises a first reflection surface at least for transmitting visible light and a second reflection surface at least for transmitting light with a predetermined wavelength, and reflection light from said first reflection surface reaches said second reflection surface and reflection light from said second reflection surface runs perpendicularly to said optical axis.

2. An automatic survey instrument according to claim 1, wherein said first reflection surface is a dichroic mirror and transmits at least visible light, and said second reflection surface is a dichroic mirror and transmits at least light with one infrared wavelength.

3. An automatic survey instrument according to claim 2, wherein the first reflection surface of said dichroic mirror transmits light with wavelength of 400 nm to 650 nm and reflects light with wavelength of 650 nm to 850 nm, and said second reflection surface reflects light with wavelength of 650 nm to 720 nm and transmits light with wavelength of 720 nm to 850 nm.

* * * * *